US007639409B2

(12) United States Patent
Bressler

(10) Patent No.: US 7,639,409 B2
(45) Date of Patent: Dec. 29, 2009

(54) SCANNER WITH BUILT IN MASS STORAGE DEVICE

(76) Inventor: Bruce Bressler, 8604 W. Mississippi Pl., Lakewood, CO (US) 80232

( * ) Notice: Subject to any disclaimer, the term of this patent is extended or adjusted under 35 U.S.C. 154(b) by 1103 days.

(21) Appl. No.: 11/027,642

(22) Filed: Dec. 30, 2004

(65) Prior Publication Data

US 2005/0171928 A1  Aug. 4, 2005

Related U.S. Application Data

(60) Provisional application No. 60/481,964, filed on Jan. 29, 2004.

(51) Int. Cl.
*H04N 1/00* (2006.01)
*H04N 1/04* (2006.01)

(52) U.S. Cl. ............... 358/474; 358/404; 358/496; 358/498

(58) Field of Classification Search ........... 358/474, 358/475, 1.16, 1.6, 522, 523, 524, 400, 401, 358/402, 403, 404, 444, 482, 486, 493, 496, 358/498, 448, 1.1, 500, 509, 505, 430, 439, 358/449, 443, 453
See application file for complete search history.

(56) References Cited

U.S. PATENT DOCUMENTS

| 4,525,788 | A | * | 6/1985 | Gottlieb et al. | 700/221 |
|---|---|---|---|---|---|
| 5,432,614 | A | * | 7/1995 | Yamamoto | 358/403 |
| 5,530,907 | A | * | 6/1996 | Pavey et al. | 710/69 |
| 5,792,281 | A | * | 8/1998 | Diehl | 148/205 |
| 5,974,177 | A | * | 10/1999 | Krtolica | 382/202 |
| 6,027,024 | A | * | 2/2000 | Knowles | 235/472.01 |
| 6,081,629 | A | * | 6/2000 | Browning | 382/313 |
| 6,118,518 | A | * | 9/2000 | Hobbs | 356/4.09 |
| 6,747,762 | B1 | * | 6/2004 | Josephsen et al. | 358/453 |
| 7,349,010 | B2 | * | 3/2008 | Bryant et al. | 348/207.1 |
| 2001/0011680 | A1 | * | 8/2001 | Soltesz et al. | 235/379 |
| 2001/0041616 | A1 | * | 11/2001 | Edwards et al. | 463/42 |
| 2002/0027603 | A1 | * | 3/2002 | Kuwata et al. | 348/232 |
| 2003/0053150 | A1 | * | 3/2003 | Murata | 358/474 |
| 2003/0123104 | A1 | * | 7/2003 | Sasakuma et al. | 358/474 |
| 2003/0139840 | A1 | * | 7/2003 | Magee et al. | 700/133 |
| 2004/0019613 | A1 | * | 1/2004 | Jones et al. | 707/200 |
| 2004/0057064 | A1 | * | 3/2004 | Stringham | 358/1.13 |
| 2004/0103085 | A1 | * | 5/2004 | Ly et al. | 707/3 |
| 2004/0190084 | A1 | * | 9/2004 | Shirai | 358/474 |
| 2004/0218064 | A1 | * | 11/2004 | Wakao | 348/231.2 |
| 2005/0061887 | A1 | * | 3/2005 | Garrison et al. | 235/462.07 |
| 2005/0151997 | A1 | * | 7/2005 | Murakami et al. | 358/1.16 |
| 2006/0045386 | A1 | * | 3/2006 | Fukuoka et al. | 382/305 |
| 2006/0184452 | A1 | * | 8/2006 | Barnes et al. | 705/50 |
| 2007/0050696 | A1 | * | 3/2007 | Piersol et al. | 715/500 |

* cited by examiner

*Primary Examiner*—Jerome Grant, II
(74) *Attorney, Agent, or Firm*—Bruce Bressler

(57) ABSTRACT

A scanner capable of operating independent of an attached computer so that scans of text and images can be instantly stored on media. In one embodiment of the present invention, a zip drive or CD burner receives information directly from the scanner so that information is stored instantly upon scanning without the need to operate a separate computer or deal with separate steps of scanning, sorting, and then recording onto media. While a computer, scanner, and media recording device are generally necessary to scan office documents, for example, the present invention can operate independently of all of them without the hassle of networking and communication interface problems.

2 Claims, 3 Drawing Sheets

SCANNER WITH BUILT IN MASS STORAGE DEVICE

REFERENCE TO RELATED APPLICATIONS

This application claims priority to and incorporates herein in its entirety the provisional application No. 60/481,964 filed on Jan. 29, 2004 entitled "A Scanner With Built In Storage Drives", and having the same inventor as this application.

FIELD OF INVENTION

The present invention relates to devices for scanning documents.

BACKGROUND OF THE INVENTION

Living in the information age, the amount of information available to the average person is abundant. Such an abundance of information requires organization in order to prevent clutter from accumulating. In the work environment, organization promotes productivity by permitting people to toil in a more proficient fashion. Paper filing systems have long been used as a method of organization. In a paper filing system of organization, cabinets, shelves, trays, carts, and folders are popular tools to categorize, file, and store items.

While the paper filing system offers benefits of organization, flaws also accompany such a system. Paper filing systems present the difficulty of retrieving files that have been stored. The process of retrieving files may take a long duration of time depending on if the file has been properly organized or if the file is currently in use by someone else in or outside the office/home. Also, filing documents in proper folders or cabinets takes a long time and often misfiling or loss of documents occurs. As a result, in searching for a particular document, a person may have to sift through loads of paper in search of a document or wait until the file to become available. Both incidents result in a waste of time. Another flaw of the paper filing system is that it can become costly; as such a system requires cabinets and an array of other tools to achieve organization. In addition to the cost, cabinets often take up much space, thus reducing the working space available.

Another traditional method of storing information is recording documents on to microfilm. Such a method transmits the original document to a copy in the form of a thin paper or photographic film, which may last for 500 years if stored in proper conditions. However, microfilm is accompanied by several disadvantages. A limitation of microfilm is that the film must be chemically treated before usage, which can become time costly. Also, microfilm retains little grayscale aptitude, which results in the viewer only being able to see a high contrast of black and white text documents and pictures. Due to the material in microfilm, the device creates poor paper copies, scratches easily, and requires a special storage environment to ensure prolonged existence.

With the vast innovation of computer technology, information is becoming gradually more stored in digital formats. Documents not previously created in a digital format, such as paper files, can easily be converted in Tagged Image File Format (TIFF), or comparable electronic file formats, such as Graphics Interchangeable Format (Off), Joint Bi-level Image Experts Group (JBIG), Joint Photographic Experts Group (JPEG), or Acrobat's Portable Document Format (PDF). Paper files can be converted into digital format's such as these via a document scanner that sends the files to a computer interface, which a user may then view the files on a monitor or print the files onto paper.

The system of storing paper files in digital format is known as electronic filing. Such a system displays many benefits, considering the fact that computers operate at rapid speeds. Thus, searching, retrieving, as well as many other operations concerning files can be performed virtually instantly. Using an electronic filing system opens up space by eliminating the need for file cabinets. A plurality of documents may be stored on a disk, which makes filing quick and easy.

An important component in an electronic filing system is a document scanner. The scanner has become a popular electronic device to use alongside with personal computers for work, school, or leisure. In general, scanners obtain information from printed media in order that this media be read and stored in an array of computer applications. The science of the standard scanner is that the device has a light structure comprising of a lamp, mirrors, and lens placed in a certain configuration within a hollow space, and an assortment of photosensitive machinery. This structure produces electrical signals in ratio to the amount of light exposed. A flat glass usually sits on top of the hollow space and a document is fed into the system across the flat glass as the lamp is aimed at the document. Light bounces of the document and reflects back to the hollow space in the direction of the photosensitive machinery. An image is constructed and transported to a computer interface via cables and wires.

While scanners are extremely useful in electronic filing systems, they also posses some complicating faults. When the scanner constructs an image of a print document, this image is only stored within the device temporarily. In order to store the image permanently the image is transported to a personal computer, which is attached to the scanner through cables and wires. Thus, a scanner must be in close proximity of a computer-processing unit (CPU), such as a personal computer. Conventional scanners do not offer users the ability to place a scanning device in any particular location regardless if there is a computer present or not. Subsequently, the user's mobility is confined when using a conventional scanner in an electronic filing system.

An assortment of scanning devices has become available to use as part of an electronic filing system.

U.S. Pat. No. 4,525,788 issued to Robert K. Gottlieb on Jun. 25, 1985 shows a method and device for providing a scanner interface circuit, yet unlike the present invention, this device is for use with a universal multi-station document inserter and contains no disk writer within the unit.

U.S. Pat. No. 5,432,614 issued to Yamaoto, Keiji on Jul. 11, 1995 shows an electronic filing device that contains a scanner that scans documents and stores image information, yet unlike the present invention, this device only temporarily stores information. Thus information requires the use of a computer to transfer the information obtained to permanent storage.

U.S. Pat. No. 5,530,907 issued to Kent Pavey on Jun. 25, 1996, U.S. Pat. No. 5,974,177 issued to Radovan V. Krtolica on Oct. 26, 1999, and U.S. Pat. No. 6,181,993 issued to Rene F. A. Collard on Jan. 30, 2001 show devices that scan and distribute documents for storage, yet unlike the present invention, these devices utilize a network interface to operate.

U.S. Pat. No. 6,027,024 issued to Carl Knowles on Jul. 3, 1997 and U.S. Pat. No. 6,081,629011 Jun. 27, 2000 show handheld scanner devices, yet unlike the present invention, these devices provide access to the WWW and are designed for surfing the Internet.

U.S. Pat. No. 5,792,281 issued to Keith T. Knox on Aug. 4, 1998 shows a method, that unlike the present invention, is primarily concerning correcting the amount of light reflected by a document being processed by a scanning device.

U.S. Pat. No. 6,118,518 issued to Philip C. D. Hobbs on Sep. 12, 2000 shows a portable pocket 3-D scanner, yet unlike the present invention, this device stores a limited amount of files, and may only scan items of a small size.

Thus there is a need for a document scanner that does not need to be connected to a desktop personal computer, posses the capability of storing information files, and reduces the need for paper files, yet is still compatible to use with any personal computer if the need is present.

SUMMARY OF THE PRESENT INVENTION

The embodiments of the present invention improves upon the various previous document scanners by possessing the ability to function separate of a desktop personal computer, store an abundant amount of files on ZIP or CD-ROM Disk, as well as operate efficiently. Simply, one embodiment of the present invention comprises a document scanner integrated with one or more mass storage devices into a single housing such that documents can be scanned and filed into various electronic folders on the media of the mass storage device without the use of a separate personal computer.

Embodiments of the present invention are typically comprised of: (i) an examining component for scanning documents and providing an image signal, by shining a bright light on the scanned document and sensing the reflected image with light sensors such as but not limited to CCDs and converting them into photoelectric signals; (ii) a collection component that temporarily maintains information received from the examining component; and (iii) a writing storage component for permanently recording information to a mass storage media device such as a CDIRW drive, ZIP drive, or USB memory device.

According to the present invention, it is possible that an office having no desire for a computer network, yet needs to store large amounts of paper files, may reduce the need for a large file room and numerous file cabinets by scanning and electronically filing files. The present invention has the capability to scan a file to a built in CD/RW drive, ZIP drive, a USB memory device or other mass storage device located in the writing storage component which is integrally contained with the examining component and the collection component in a single housing.

Prior to scanning, the desired file or document to be scanned is inserted into the paper feeder tray of embodiments of the present invention. Next, a user may (i) utilize a keypad and LCD display monitor located on a control panel located on the housing to name a file, (ii) insert a recording media into the mass storage device, such as a CD/RW or a ZIP disk, and start the scanning process. The paper information is scanned in, photoelectrically converted, temporarily stored, and permanently recorded on to the mass storage media. This process utilized by the present invention makes more office space available, the filing procedure efficient, without employing the use a cumbersome network thus permitting a fast, proficient, and simplistic, storage filing system.

The present invention will become more evident from the following detailed description given and complementary drawings, which are simply for modeling purposes, and thus are not restrictions or limitations of the present invention.

BRIEF DESCRIPTION OF THE INVENTION

DETAILED DESCRIPTION OF THE INVENTION

Terminology

The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

The phrase "mass storage device" along with related variations of the phrase as used herein pertains to any device adapted to electronically store computer files. Typical mass storage devices include but are not limited to CD-R/RW drives, DVD+-R drives, Zip drives, USB memory devices, and hard drives.

The phrase "mass storage media" and related phrases used herein refer to removable or fixed media on which a large amount of electronic data and/or files can be stored. Typically, mass storage media is used in combination with a "mass storage device", but in certain instances, such as a USB memory device, the "mass storage media" and "mass storage device" can be synonymous with each other. Preferably, the "mass storage media" has a minimum capacity of at least 64 MB, more preferably at least 100 MB, and most preferably at least 500 MB.

One Embodiment of the Scanning Device

Figure 1:
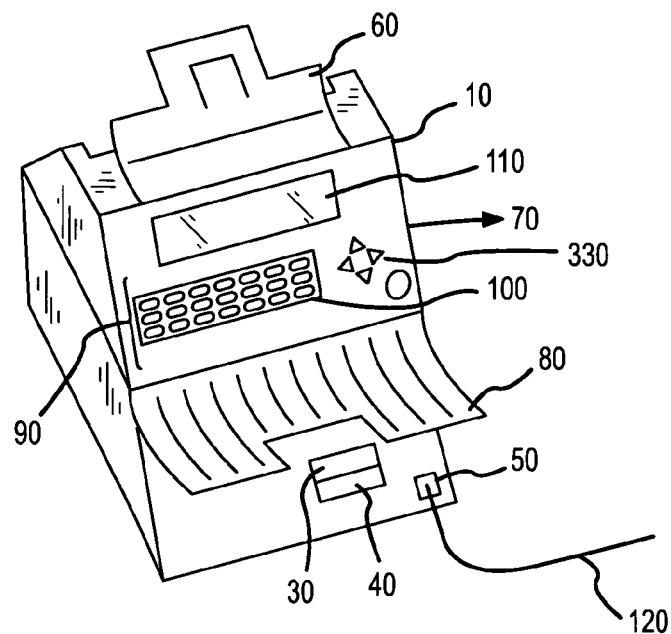
FIG. 1 shows the present invention in perspective view.
Figure 5:
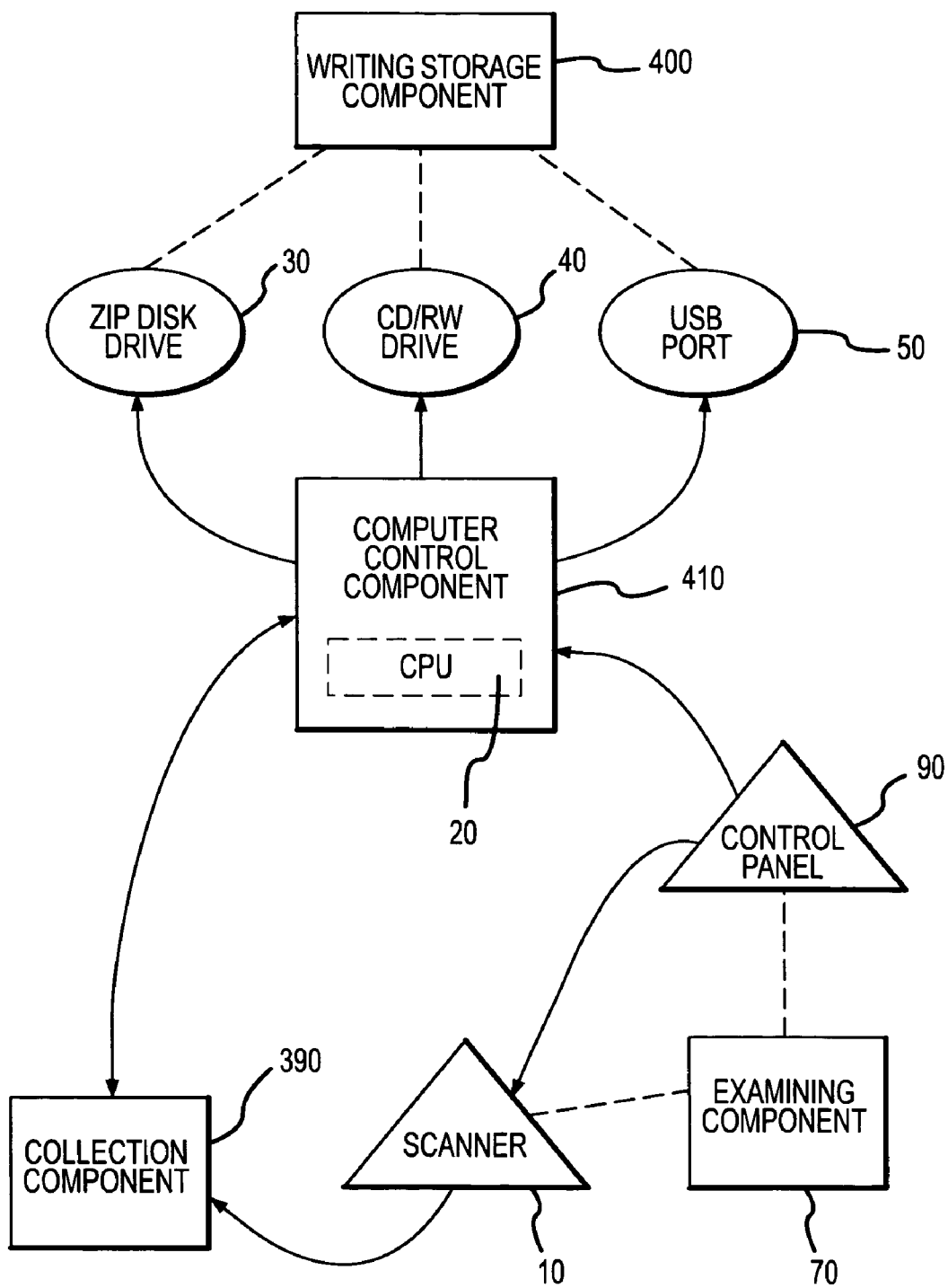
FIG. 5 shows a diagram of the component parts of the present invention.

As illustrated in FIGS. 1 & 5, one embodiment of the present invention comprises (i) a examining component 70 including a scanner 10 to digitize a paper document, (ii) a collection component 390 comprising memory to temporarily hold electronic data relating to the scanned document, (iii) a built in CPU 20 (central processing unit) in a computer control component 410 for processing the electronic data and directing the storage thereof, and (iv) a writing storage component 400 typically including one or more of a ZIP disk drive 30, a CD/RW drive 40, a USB port 50 to couple a USB memory device, or other mass storage device. The scanner 10 is supplied for detecting information from a document by shinning a bright light at the paper document, and distinguishing the reflected light with light sensor like CCDs 180 (Charged Coupled Device) or CMOS sensors, translating them into electric signals. The illustrated embodiment further includes a transfer paper feeder tray 60 for holding and moving documents in consecutive order to the examining component 70, and a receiving paper feeder tray 80, where documents are positioned after they have been successfully scanned. A control panel 90 is typically provided so that a user may easily operate the device. Preferably, the control panel 90 includes keypad 100 and an LCD display monitor 110 and an arrow keypad 330. The examining component 70 is typically comprised of a scanner 10 formed of a glass plate, a CCD array 180 and a mechanism system of mirrors 150, lens, and a filter 170 system for imaging the document on the CCD array 180, further explained in FIG. 2.

As clearly illustrated in FIG. 1, the one embodiment is entirely self-contained and integrated into a single housed unit in contrast to a scanner coupled with a personal computer which involves several distinct components coupled to together by way of cables or wireless means. In variations of the scanning device, the device can be portable and lightweight to allow it to be easily transported from location to location without the need to also carry a personal computer. In certain variations, the device can be battery powered to permit field use where electrical outlets are not conveniently available. In yet other variations, the CCD array (or other type of imager) can be fixedly mounted within the device with the document to be scanned being passed over the CCD array in a controlled manner during the scanning process.

Having the previously described configuration, the present invention is able to retrieve information from a paper file and store it on a mass storage media such as (i) a disk placed the ZIP disk drive 30 or CD-RW drive 40, or (ii) a USB memory device that is connected to the USB port 50.

Figure 2:
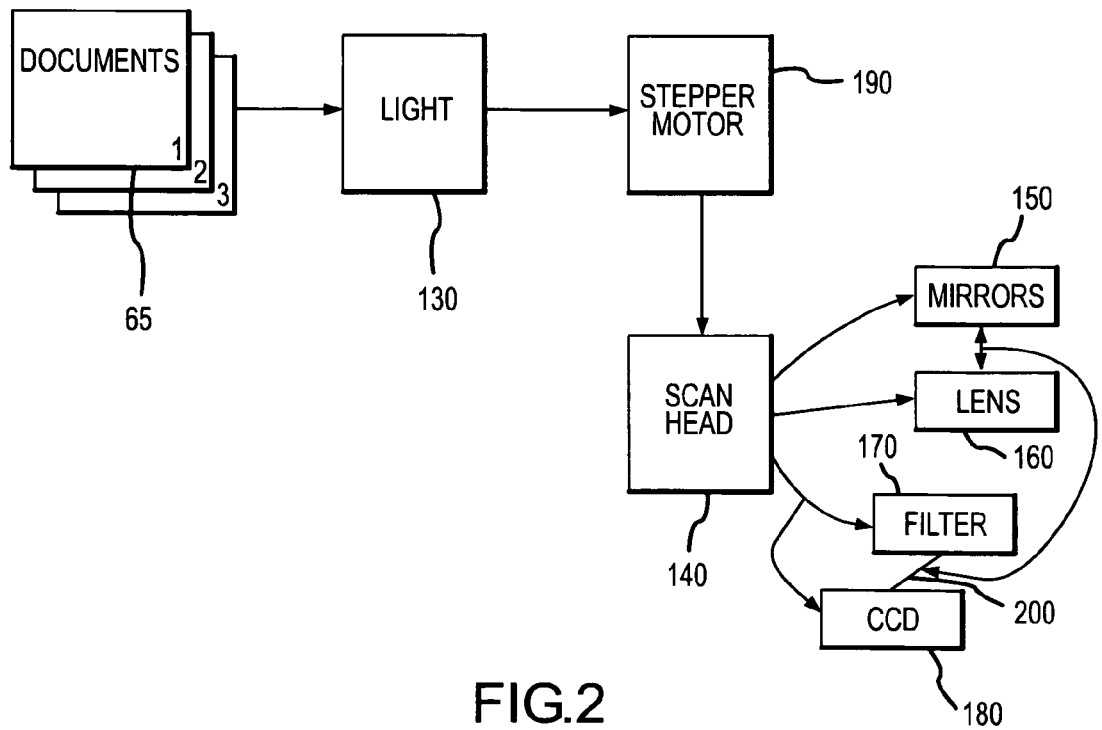
FIG. 2 shows a block diagram of the examining component of the present invention.

As shown in FIG. 2, in the scanning process, a document 65 is taken from the transfer paper feeder tray 60 and moved across a glass plate of the scanner 10, wherein a lamp 130 lights the document. A scan head 140 typically comprised of mirrors 150, lens 160, filter 170, and a CCD array 180, travels across the document via a belt attached to a stepper motor 190. Once the scan head has concluded a complete scan of the document, the document image is reflected by angled mirrors 150 onto a lens 160. The lens focuses the image through a CCD array filter 200.

Figure 3:
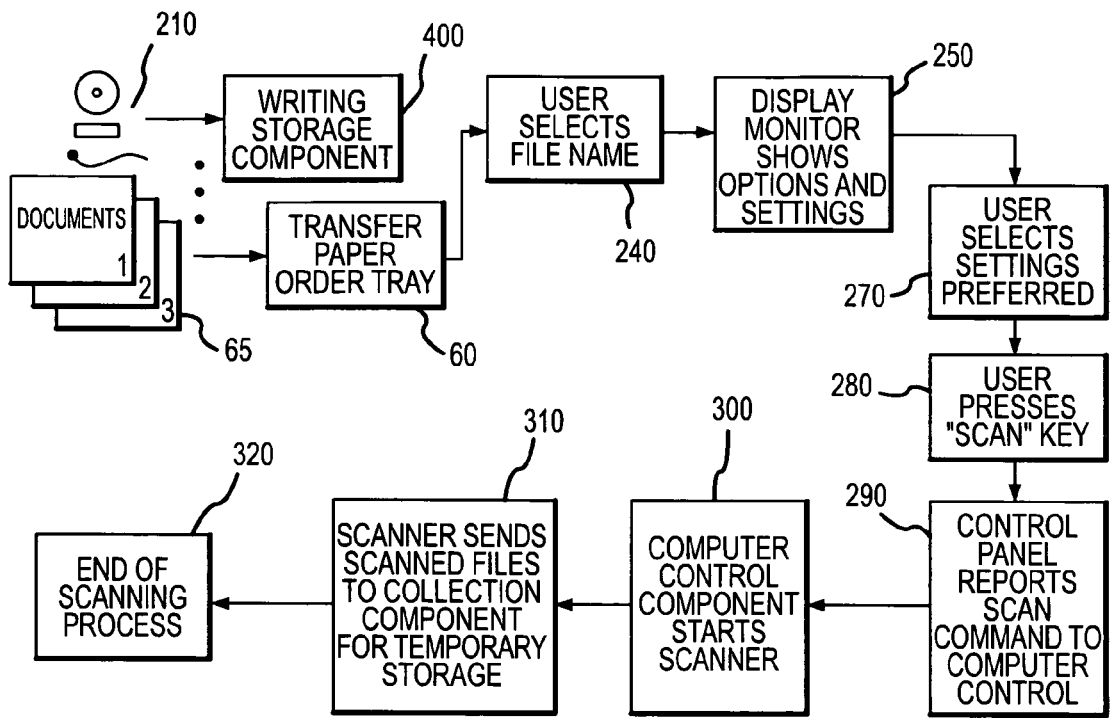
FIG. 3 shows a flow chart of the scanning process of the present invention.

FIG. 3 displays the course of action for when a user desires to scan documents using the present invention in order that the scanned document or file may be stored on mass storage media for further use and/or filing at a distant and remote personal computer. Prior to scanning, the user inserts a CD-RW disk or ZIP disk 210 into the corresponding CD-RW disk drive 40, ZIP disk drive 30 of the writing storage component 400, or connects a USB memory device to the USB port 50 and then places the paper original document 65 in the transfer paper feeder tray 60. The user may use the keypad 100 and the arrow keypad 330, located on the control panel 70, to select a file name and prompt the present invention to display scanning options as indicated in block 240. The LCD display monitor 110 typically presents the user's selections. The display monitor when prompted may display choices for settings and parameters for the scan process such as resolution, format (TIFF, JPEG, PDF, etc.), if the document needs to be scanned as a one sided document or double sided document, as well as the preferred storage media (CD/RW disk, ZIP disk, or USB device) as indicated in block 250. The user may use the keypad to select preferred settings or use prescribed default settings as indicated in block 270. Once the file has been named and settings selected, the user may press the scan key to activate scanning as indicated in block 280.

In response, the examining component 70 begins transferring paper documents page by page to the scanner, scans them, and creates digital files of the original paper file as indicated in blocks 290 & 300. The digital files are temporarily stored in the collection component as indicated in block 310 before the files are passed on to the writing storage component 400, which in the illustrated embodiment are comprised of a ZIP disk drive 30, CD/RW drive 40, and a USB port 50. Once documents are sent to the collection component 390, the scanning portion of the process is concluded in block 320. The temporary collection component 390 has a storage space large enough to briefly store the amount of image information of pages from documents read and supplied by the examining component 70.

Figure 4:
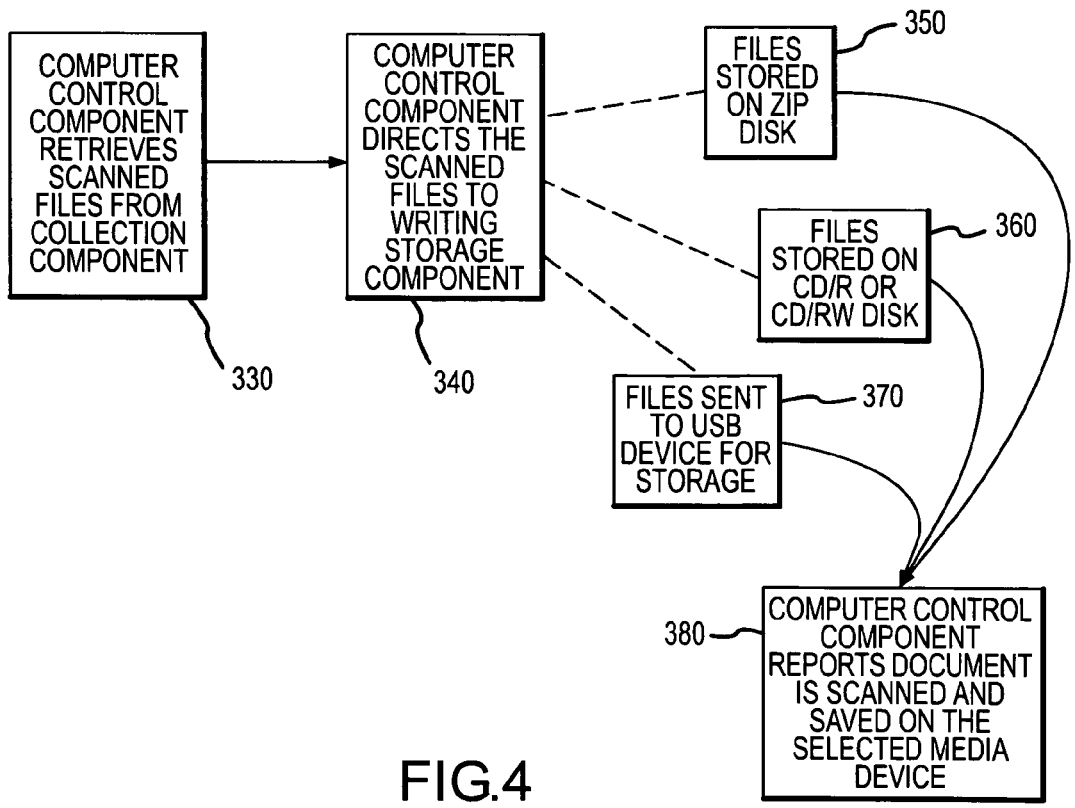
FIG. 4 shows a flow chart of the writing storage process of the present invention.

FIG. 4 displays the course of action the present invention takes to retrieve scan documents and permanently write and store the documents on a media storage device. A built-in CPU 20, located in the computer component 410 of the present invention, operates a program that controls the operation of storing and writing information to storage media devices, such as a ZIP disk drive, CD-R/RW drive, or USB memory device. Thus the built-in CPU 20 processes the pixels of information received from the temporary collection component 390 and directs the information to the selected mass storage device for permanent storage as indicated in block 330.

The built-in CPU 20 commands the temporary collection component 390 to retrieve the image information that has been scanned from the examining component 70. Next, the CPU 20 commands the writing storage component 400 to write the image information, temporarily stored in the collection component, to the preferred mass storage media as indicated in block 340.

If a ZIP disk is selected as the preferred mass storage media, energized write heads located in the Zip drive set the data on the disk by magnetizing magnet particles fixed in the disk surface as indicated in block 350. Alternatively, if a CD-R or CD-RW disk is the preferred storage media, a moving write laser assembly located in the CD-RW drive set data on the disk by altering the surface of the disk as indicated in block 360. If the user selects to store information on a USB memory device, the pixel information is sent via a USB port 50 and optionally a cable 120 and stored on the USB device in a digital format as indicated in block 370.

When all documents have been scanned and stored permanently on a media storage device, the display monitor will typically display that the document has been scanned and stored as indicated in block 380. In preferred embodiments, the scanned and digitized documents are stored in a format that is readable on a computer running either a Windows or Macintosh operating system, such that the mass storage media can be used in conjunction with a personal computer to move the digitized images to the computer for viewing and use thereon.

As explained previously, in the illustrated embodiment having a built in CPU 20, ZIP disk drive 30, CD-RW drive 40, and USB port 50, each having the ability to write and permanently store information digitally from paper documents, it possible to easily have electronic files made and reduce cabinet space. For example, a user may scan paper documents and store the documents to a disk, virtually simultaneously, thus enabling the user to perform multiple tasks through the usage of one compact device. The construction of the present invention is cost efficient (costing less then utilizing several stand-alone devices, such as a separate desktop computer, scanner, and network system), takes up minimal room space, and uses less energy than separate units. Therefore, the special features can provide increased organization and enhance a user's productivity and efficiency, without complexity or aggravation.

The scanning and storing method employed by the present invention, allows the user to have a digital file that they can take with them and use on any computer containing a ZIP drive or CD-RW drive, no matter where the computer is located. Such a method, which does not need to employ a network to operate, also allows for easy and simplistic electronic filing. Thus, the present invention's operation is very beneficial for home personal use or a small office.

The present invention employs conventional technology for all of its purposes and functions. By combining conventional, existing technology in unique relationships to solve certain problems unsolved without the use of the present invention, the present invention is novel and nonobvious.

I claim:

1. A method of digitizing a document, the method comprising: placing the document in a document feeder of a document scanning device, the document scanning device comprising a scanning unit and at least a first mass storage device contained within a common housing, the document scanning device further including a controller and a control panel; selecting an electronic file name for a digitized version of the document using the control panel; scanning the document and creating a digitized version of the document; storing the document on a first mass storage media associated with the first mass storage device; removing the first mass storage media from the first mass storage device; placing the first mass storage media in a mass storage device associated with a personal computer; and displaying the document on a monitor associated with the personal computer.

2. The method of claim 1, wherein the document scanning device further includes a second mass storage device, and the method further comprises; selecting one of the first and second mass storage devices for storage of the digitized version of the document using the control panel.

* * * * *